May 17, 1966  J. F. FRENCH ET AL  3,252,165
COATING APPARATUS
Filed Jan. 14, 1963  4 Sheets-Sheet 1
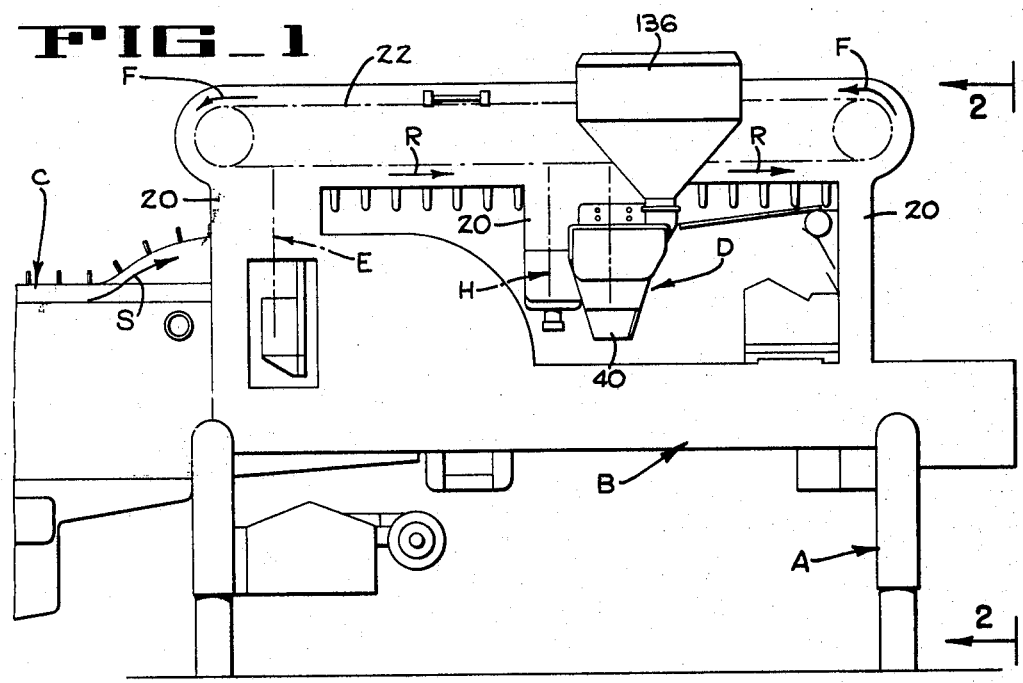
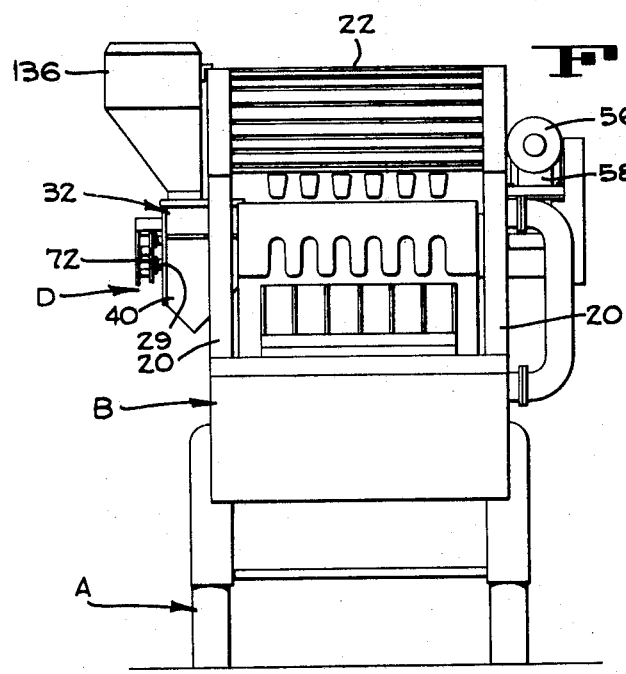
INVENTORS
JOHN F. FRENCH
BY Hans G. Hoffmeister
ATTORNEY May 17, 1966  J. F. FRENCH ET AL  3,252,165
COATING APPARATUS
Filed Jan. 14, 1963  4 Sheets-Sheet 2
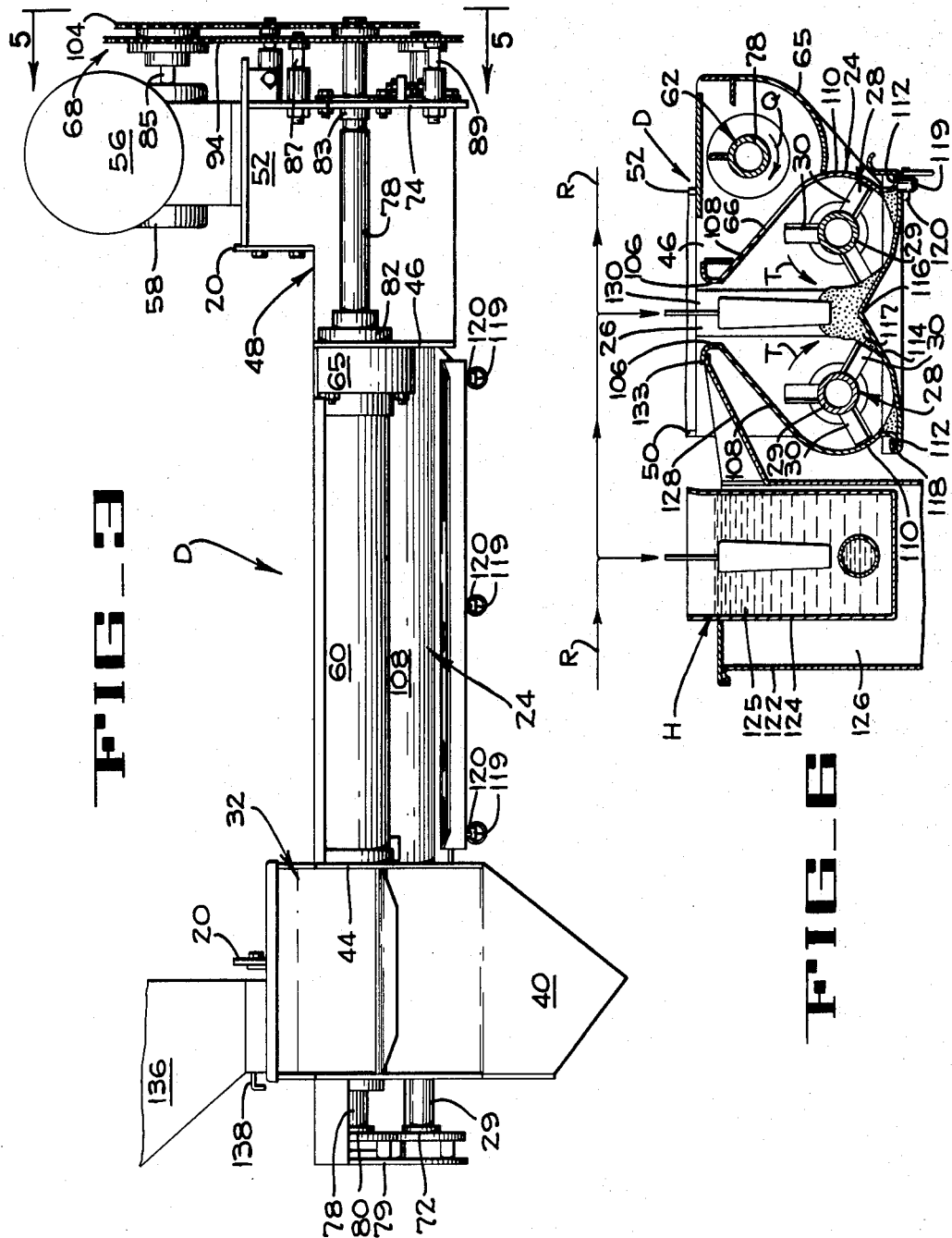
INVENTOR
JOHN F. FRENCH
BY Hans G. Hoffmeister.
ATTORNEY May 17, 1966  J. F. FRENCH ET AL  3,252,165
COATING APPARATUS
Filed Jan. 14, 1963  4 Sheets-Sheet 3
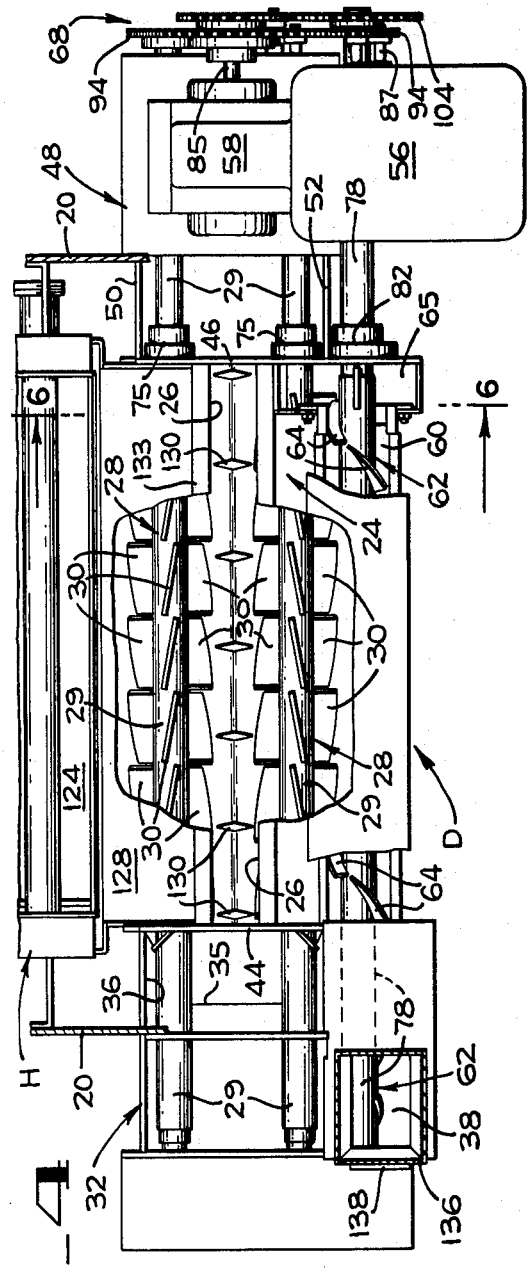
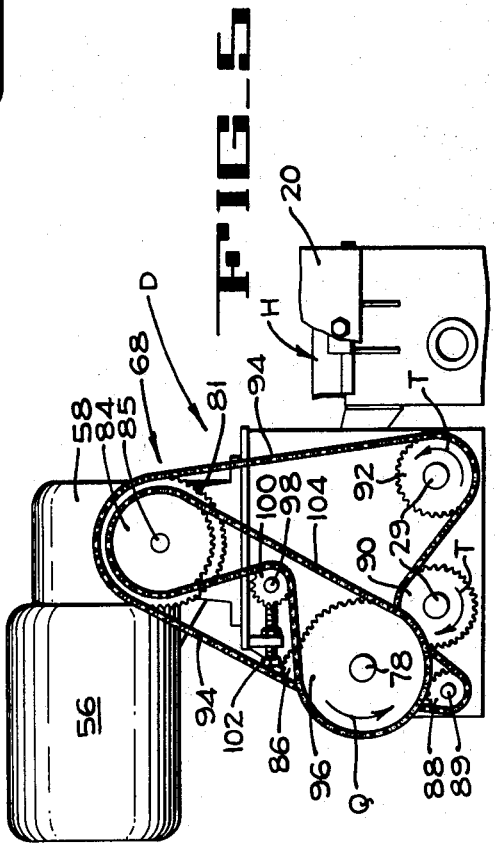
INVENTOR
JOHN F. FRENCH
BY *Hans F. Hoffmeister*
ATTORNEY May 17, 1966  J. F. FRENCH ET AL  3,252,165
COATING APPARATUS
Filed Jan. 14, 1963  4 Sheets-Sheet 4
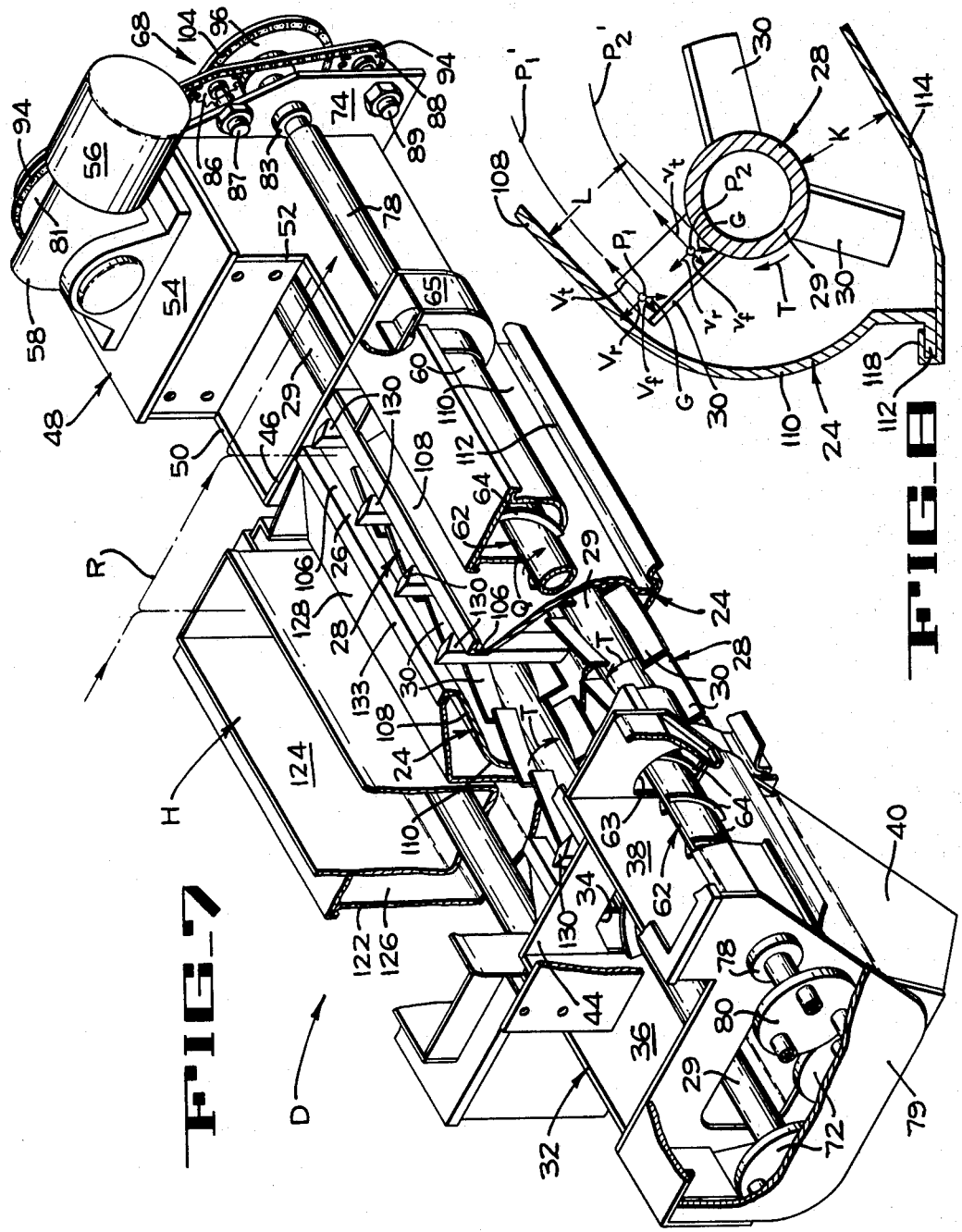
INVENTOR
JOHN F. FRENCH
BY Hans G. Hoffmeister
ATTORNEY

United States Patent Office 3,252,165
Patented May 17, 1966

3,252,165
COATING APPARATUS
John F. French, Willingdon, England, and Marlin B. Rasmusson, Sacramento, Calif., assignors to FMC Corporation, San Jose, Calif., a corporation of Delaware
Filed Jan. 14, 1963, Ser. No. 251,283
3 Claims. (Cl. 118—24)

This invention relates to a coating apparatus, and more particularly to a coating apparatus for applying selected comminuted or granular material to confections.

The apparatus of this invention include a container or hopper for storing selected granular material which continually discharges, preferably by gravity, to an elongated chamber. Contra-rotating, agitating and conveying rotors, are located in the chamber for propelling the granular material in a predetermined manner to a particular zone of the chamber to achieve substantially equal granular material dispersion or distribution in such a zone. A conveying device is provided for locating the confections in the zone for a predetermined amount of time to expose the outer surface of the confection to the propelled granular material so that the confection is coated.

The prior art solutions to problems involved in coating of confections have been reasonably succesful but such solutions involve complex structural associations which were prone to relatively rapid breakdown and/or became ineffective, at regular intervals, to achieve the desired uniform distribution of granular material to the outer surface of the confection. This invention is directed to solving these problems by providing an apparatus which is simple in construction and applies a uniform coating of granular material to the outer surface of the confection.

Accordingly, an object of this invention is to provide a new and improved coating apparatus.

Another object is to provide a new and improved coating apparatus which distributes the coating material uniformly to the outer surface of the confection.

Another object of this invention is to provide a new and improved coating apparatus having a coating chamber formed to cooperate with contra-rotating agitators so that a uniform distribution of granular material is achieved in a selected zone of the chamber.

Another object of this invention is to provide a new and improved dry coating apparatus which includes a formed trough to which granular material is continually supplied for distribution to confections and wherein the quantity of granular material required for such distribution is very small.

Another object of this invention is to provide a new and improved coating apparatus adapted for quick and easy cleaning.

Another object of this invention is to provide a new and improved coating apparatus which can vary the rate at which granular material is deposited on the confection.

These and other objects and advantages of this invention will become more apparent when taken in conjunction with the following drawings in which:

FIGURE 1 is a side elevation showing the relation of the dry coater, constructed in accordance with the principles of this invention, with a confection forming mechanism.

FIGURE 2 is an end view of the machine of FIGURE 1 taken looking in the direction of arrows 2—2 of FIGURE 1.

FIGURE 3 is a side elevation of the coating apparatus.

FIGURE 4 is a plan of the coating apparatus shown in FIGURE 3.

FIGURE 5 is an end elevation of the coating apparatus looking in the direction of arrows 5—5 of FIGURE 3.

FIGURE 6 is a section of the coating apparatus taken substantially along the line 6—6 of FIGURE 4.

FIGURE 7 is a perspective of the coating apparatus, with certain parts broken away, showing certain of the details of construction.

FIGURE 8 is a fragmentary enlarged section of one of the agitators and the adjacent part of the casing.

Referring now to FIGURES 1 and 2, there is shown a suitable supporting structure A having mounted thereon a formed frame B. The frame B includes laterally spaced longitudinally extending side members 20 having an endless circulating conveyor 22 on the upper portion extending therebetween. For purposes of description, the direction in which the conveying surface moves is indicated by the arrows F. A portion of a confection forming apparatus C, which advances frozen confections in molds in the direction of arrow S with sticks projecting upwardly, is shown in its cooperative environment with the frame B. The conveyor 22 is provided with grippers that are arranged to grip the upwardly projecting sticks at a defrosting station E, remove the confections from the molds, and transport the confections in the direction R to a coating apparatus D which is constructed in accordance with the principles of this invention. The confection forming apparatus C advances the confections in longitudinally spaced rows with each row having a desired number of confections. The coating apparatus disclosed herein is adapted for use with a machine in which each row consists of six transversely aligned confections. The confection-forming apparatus C, the conveyor 22 and their associated mechanism may be of the type disclosed in the patent to Rasmusson 3,031,978 and reference may be had to said patent for details of construction and operation not mentioned herein.

The rows of confections are serially transfered, an entire row at a time, to the conveyor 22 which carries them to a preliminary coating station H, and thence to the coating apparatus D. The coating apparatus D is secured to the side frame members 20 to extend transversely relative to the direction of circulation of the conveyor 22 and the conveyor 22 is arranged to serially present each row of confections to the coating zone of the coating apparatus D so that selected granular material may be deposited thereon. The particular manner of such manipulation will be hereinafter more particularly described.

Referring now to FIGURES 3 through 6, the dry coating apparatus of this invention is shown to include an elongated casing 24 which is generally heart-shaped in cross-section (FIG. 6) with the apex thereof being truncated to form a generally rectangular opening 26 which extends longitudinally of the casing. A pair of elongated impellers or agitators 28 are rotatably mounted in the coating chamber defined inside the casing 24, and each agitator includes a series of radially extending blades 30 that are secured to a shaft 29 at points spaced longitudinally of the shaft. As shown in FIGURE 7, the blades 30 are secured to the outer periphery of the shaft 29 at a slight angle relative to the longitudinal axis of the shaft so as to form a slight helix. The blades 30 not only serve to engage and propel the granular material upwardly toward a selected zone of the casing 24 to coat the confections but also effect a general migration or conveying movement of the granular material longitudinally relative to the casing 24.

A housing 32 is secured to one end of the casing 24 and has an opening 34 communicating with the interior of the casing 24 so that material conveyed by the blades 30 through casing 24 without being applied to a confection is received by the housing 32. More particularly, the housing 32 includes two compartments 36 and 38, with compartment 36 receiving granular material from the agitators 28 and compartment 38 forming a supply hopper for material that is to be circulated through the casing 24. As shown in FIGURES 4 and 7, the compartment 36 has a passageway 35 leading to a lower discharge hopper 40 which receives unused granular material conveyed by the agitators 28 to the compartment 36 and directs it to a portable container (not shown) which may be used to again deposit the material in the supply compartment 38.

One end of the casing 24 is rigidly secured to a planar plate 44 which forms part of the housing 32 and the opposite end of the casing 24 is rigidly secured to another planar plate 46. The surfaces of the plates 44 and 46 to which the casing 24 is secured define the longitudinal extent of the coating zone of the casing. A support 48 includes laterally spaced plates 50 and 52 having respective ends thereof rigidly secured to the plate 46, to form a supporting structure upon which the drive mechanism of the coating apparatus is located. A plate 54, extending between and secured to plates 50 and 52, is provided for mounting a suitable motor 56, herein preferably an electric motor, and a gear reduction unit 58, cooperatively connected thereto, in a well known manner.

Coating material is supplied to the coating chamber through a U-shaped trough 60 which has the opposite ends thereof secured to the plate 44 and to the plate 46 and is located closely adjacent and generally parallel to the casing 24 as shown in FIGURE 7. An elongated conveyor, preferably a screw conveyor 62 initiating from the supply compartment 38 and extending through an opening 63 in the plate 44, terminates at the plate 46. The conveyor 62 is provided with discontinuous helical flights 64 which are operative, when the conveyor is rotated, to convey material from the compartment 38 longitudinally relative to the trough 60 toward the plate 46. Although conveyor 62 is shown with helical flights of a particular form, the principles of this invention can be practiced by using other conveying apparatus. The portion of the trough adjacent the plate 46 has a generally radially enlarged portion 65 which receives granular material conveyed by the conveyor 62. An opening 66 (FIG. 6) provides communication between the radially enlarged portion 65 and the interior of the casing 24 so that granular material received by portion 65 is transferred, herein preferably by gravity, to the portion of the interior of casing 24 adjacent the plate 46.

Rotation of the agitators 28 in the direction indicated by arrows T and rotation of conveyor shaft 78 in the direction of arrow Q is effected by a common drive train generally indicated by the numeral 68. As shown in FIGURE 7, the shafts 29 of the agitators 28 have respective ends thereof extending through the housing 32 and mounted for rotation relative thereto by suitable bearings 72. The opposite ends of the shafts 29 extend through the plate 46 and through a mounting plate 74 which is secured to the support 48. Suitable bearings and seals 75 are provided on mounting plate 46 for rotatably supporting the shafts 29 and for confining the granular material respectively, in the casing 24. The feed conveyor 62 includes a shaft 78 (FIG. 4) extending through the compartment 38 with the end portion thereof rotatably journalled, by means of a suitable bearing 80 in a wall 79 of the housing 32. The shaft 78 extends through a suitable opening in the plate 46, which is provided with a seal and a bearing 82, and through an axially aligned opening in mounting plate 74. Another bearing 83, secured to the mounting plate 74, is provided for rotatably supporting a portion adjacent the end thereof.

Referring now to FIGURE 5 the drive train or transmission 68 includes a pair of sprockets 81 and 84 keyed in side-by-side relation on a shaft 85 which is the output shaft of the gear reducer 58. The sprockets 81 and 84 are operatively connected by means of endless flexible tension devices, preferably chains for driving the agitator shafts 29 and the shaft 78 of the feed conveyor in predetermined directions and at predetermined speeds. It will be noted by inspection of FIGURES 4 and 5 that the power train for the shaft 78 and for the two shafts 29 is located, respectively, in closely adjacent parallel planes so that the respective chains and the respective reaction elements, herein preferably shown to be sprockets, are located in such planes. The power train for the shafts 29 includes a suitable idler sprocket 86 rotatably mounted on a stub shaft 87 (FIG. 4) which is secured to the mounting plate 74. In order to maintain a predetermined tension on the sprocket chain associated with the sprocket 86, the stub shaft 87 may be mounted on the plate 74 so that it is bodily slidably or bodily pivotally movable relative to the plate 74 with such movement resulting in applying a predetermined tension to the sprocket chain associated therewith. As shown in FIGURE 5, another idler sprocket 88 is rotatably mounted on a shaft 89, which shaft is, in turn, secured to the mounting plate 74. The particular illustrated position of the sprocket 88 serves to increase the arc of contact or wrap of the chain about the sprocket mounted on the adjacent shaft 29. The shafts 29 have sprockets 90 and 92, of substantially the same diameter, suitably keyed thereto in any desirable manner so that the torque applied to the sprockets 90 and 92 by the chain associated therewith causes rotation of the shafts 29. Since the sprockets 81, 86, 88, 90 and 92 are located in a common plane, an endless chain 94 of appropriate length is trained, in the manner shown, about such sprockets. Therefore, rotation of the shaft 85 and of the sprocket 81 causes, through the agency of the chain 94, rotation of the sprockets 86, 88, 90 and 92. Referring to FIGURE 5 it will be noted that the chain 94 is trained about sprockets 90 and 92 in such a manner that rotation of the shafts 29 in opposite directions is effected. The desired direction of rotation of the shafts 29 is indicated by the arrows T.

The drive for the feed conveyor shaft 78 includes the sprocket 84 which is secured to the shaft 85 for rotation therewith. A sprocket 100 is rotatably mounted on an idler shaft 98 and located in a plane containing the sprocket 84. A suitable adjustment 102 is provided for slidably bodily moving the idler shaft 98 so that a predetermined tension can be applied to the chain associated therewith. The shaft 78 has a sprocket 96 suitably keyed thereto in order to impart rotation to the shaft 78. A chain 104 is trained about the sprockets 84, 100, and 96 in the manner indicated in FIGURE 5, wherein circulation of the chain 104, caused by rotation of the sprocket 84, imparts rotation to the sprockets 100 and 96. Accordingly, rotation of the conveyor shaft 78 is effected in the direction indicated by the arrow Q, by the sprockets 84, 100, 96, and the chain 104.

Certain of the paramount advantages derived from this invention involve formation of the casing 24 so that its cooperation with the action of the agitators 28 results in a high degree of turbulence of the selected granular particles while effecting a uniform distribution of such particles in a predetermined zone of the casing 24. In FIGURE 6, which shows a cross-section of the coating apparatus taken substantially along the line 6—6 of FIGURE 4, the casing 24 is substantially heart-shaped in form as shown. The upper side walls of the casing 24 are formed by vertically disposed longitudinally extending spaced wall portions 106. The opening 26 provides access to the coating zone of the interior of the casing for the confections desired to be coated. Flat guide wall portions 108, diverging downwardly and outwardly, define the intermediate portion of the side walls of the casing 24 and such walls have generally arcuate portions 110, being oppositely oriented, as shown, defining the lower portion of the side walls. The wall portions 110 terminate respectively in longitudinally extending laterally spaced horizontal flanges 112 which are provided for releasably supporting the bottom wall of the casing 24.

Such bottom wall is indicated by the numeral 114 and it extends for the entire length of the casing 24. The bottom wall is formed with an apex 116 substantially equidistance from, and parallel to, the opposite sides of the bottom wall 114. One of the longitudinally extending lateral sides of the bottom wall 114 has formed thereon a U-shaped channel 118 which is adapted to receive, between the spaced sides thereof, the horizontal flange 112 of one wall portion 110 to provide a slide connection. The opposite longitudinally extending lateral side of the bottom wall 114 terminates below the flange 112 of the other wall portion 110 and has an opening adapted to receive a short cylindrical rod 119 that is secured to and projects downwardly from the flange. A pin 120 is adapted to be inserted in a transverse hole in the rod 119 to releasably secure the bottom wall 114 in place. Arcuate wall portions 110 form two parallel curved-wall channels with the curved portions of the bottom wall 114.

The coating zone of the casing 24 is located in a plane equi-distant from the walls 106 and containing the apex 116. The confection desired to be coated is located in such a zone by the conveyor 22 in a manner to be particularly described in the hereinafter description of the operation of this invention.

Still referring to FIGURE 6, it will be noted that the agitators 28 are located in the casing 24 adjacent the arcuate portions 110 respectively. Such a location, the particular configuration of the casing 24, and the motion imparted to the granular particles by the agitators 28 gives rise to a more uniform distribution of the granular material and at the same time the configuration of the casing requires a relatively small amount of material at any one time in the casing to achieve the desired density and uniformity of coating on the confection. In connection with the direction of rotation of the agitators 28, as indicated by the arrows T, and the relative location and form of the walls 108, each of the agitators 28 may be characterized, for purposes of description, as centrifugal fans. After the coating apparatus has been supplied with a sufficient amount of granular material, a mound 117 of such granular material having the illustrated cross-sectional shape, is formed extending the entire length of the casing 24 and being symmetrical relative to the plane contained in the coating zone. It is to be appreciated that the particular form of the mound 117 is a function of the angle of repose of the selected granular material assuming other factors to be constant. But regardless of the type of granular material used, the peak of the mound 117 must be sufficient distance above the apex 116 so that the end surface of the confection comes in contact therewith in order to achieve coating of such surface.

Referring to FIG. 8, an inlet channel K, associated with each agitator 28, extends the entire length of the casing 24 and is defined by spaced parallel planes which are tangent to the periphery of the shaft 29 and a portion of the mound 117, respectively. The distance between the planes defines one dimension of the channel K with the length of the casing defining the other dimension. A discharge channel L, also associated with each agitator 28, is longitudinally coextensive with the channel K and is defined by a plane tangent to the shaft 29 and parallel to the wall portion 108, respectively. Accordingly, the granular material engaged by the rotating blades 30 is moved through a generally arcuate path initiating at the inlet K and terminating at the discharge L.

In order to clearly describe the action of the agitators 28 exemplary granular particles $P_1$ and $P_2$ are shown at the instant they become disengaged by the blade 30. The motion of the particle $P_1$ comprises a tangential velocity component $V_t$; a gravity force component G; a radial velocity component $V_r$; and a friction force component $V_f$ derived from the atmosphere within the casing, acting in a direction opposite to the component $V_t$. The magnitude and direction of the gravity force G and the friction force $V_f$ of the particle $P_1$ is equal to the gravity force G and the friction force $v_f$ acting on the particle $P_2$ (such an equality follows since it is assumed herein that the particles $P_1$ and $P_2$ are of substantially the same mass and shape). In addition, the particle $P_2$ has a tangential velocity component $v_t$ and a radial component $v_r$, both components having the same direction as components $V_t$ and $V_r$, respectively, but being of a lesser magnitude. The particles $P_1$ and $P_2$, therefore, are shown to describe paths $P_1'$ and $P_2'$, respectively, which are generally similar in shape but with the path $P_1'$ representing the greater energy imparted to the particle $P_1$ by the blade 30.

Concurrent with the above described considerations it is to be particularly noted that the cross-sectional area of flow, from the discharge channel L to the coating zone of the casing 24, increases rapidly toward the coating zone. Such an increase causes diffusion of the particles as they transverse the space from the discharge channel L to the coating zone, which diffusion, in conjunction with the diverse energy levels of the granular particles, achieves a more uniform distribution of the particles on the confection located in the coating zone.

The above described action of the agitators achieves the desired distribution pattern of granular material mainly on the surfaces of the confection which are exposed to the trajectory of the granular particles but, as should be appreciated, the opposite surfaces of the confection which are generally parallel to such trajectories do not intercept and retain a sufficient number of particles to achieve a density of coating substantially equal to surfaces exposed to the particle trajectory. This invention solves this problem, preferably, by providing, in the coating zone of the casing 24, baffles or deflection members 130. The deflection members 130 are located in the coating zone of the casing 24 and are longitudinally spaced and oriented to lie in parallel planes which are normal to the longitudinal axes of shafts 29, for example. As shown, the plates, which are diamond-shaped in cross-section, are supported by the casing 24 and are spaced to receive a confection therebetween. Thus a certain part of the granular material propelled by the blades 30 strikes the baffles 130 at an angle and ricochets therefrom to strike and be retained by the surface of the confections, respectively, which are located in the projected area of the baffles 130.

This invention provides means, if desired, for applying a preliminary coating of oil or the like to the outer periphery of the confection with the application of the oil being accomplished by immersing the confection in the oil before it is positioned in the coating zone in the casing 24. Considering FIGURES 6 and 7 together, there is shown an elongated generally rectangular trough 122 which is located laterally adjacent the casing 24 and is substantially longitudinally coextensive therewith. A tank 124, located in the trough 122, and also being generally rectangular in form, is provided to contain a suitable preliminary coating material, herein, preferably vegetable oil, which is applied to the outer surface of the confection before the confection is dry coated. As shown, the tank 124 is dimensioned to form with the trough 122 a generally rectangular space 126 around the tank 124 which space serves, in part, as an overflow for oil which may flow over the upper end of the tank 124. A formed suitable pan 128 commencing from the lower surface of a flange 133 is provided for accumulating and returning to the trough 122 any excess preliminary coating material 125 which may drip from the confections as they are transferred between the tank 124 and the opening 26 by the conveyor 22.

In describing the operation of the disclosed preferred embodiment it will be assumed that the apparatus has been primed with selected granular material so that the conveying action of the conveyor 62 and the agitating and conveying action of the agitators 28 can be achieved. From any suitable source of electrical energy, the motor 56 is electrically energized to effect rotation of the shaft 85 and sprockets 81 and 84 secured thereon. By means of the sprocket chains 94 and 104, rotation is imparted, in the indicated directions, to the shaft 78 and the shafts 29. With such shafts rotating, granular material deposited in the supply compartment 38 is conveyed, as viewed in FIGURE 7, by the conveyor 62 toward the plate 46. The granular material so conveyed is deposited in the radially enlarged portion 65 and thereafter, by means of opening 66, the granular material is conveyed to the interior of the casing 24. From this point the blades 30 on the shafts 29 propel the granular material toward the coating zone and certain of the particles adhere to the outer surface of the confections which are located in the coating zone by the conveyor 22. All of the particles so propelled do not adhere to the surface of the confection desired to be coated, since for example, there are areas of the coating zone which do not have any part of the outer surface of the confection located therein or a particle may strike a portion of the surface of a confection which has already been coated. In normal operation, a part of the granular material which has not adhered to the outer surface of confections is gradually conveyed, by the blades 30, toward the compartment 36 and through the opening 34. The passageway 35, formed in the bottom of the compartment 36, permits the granular material conveyed thereto to drop or fall to the discharge hopper 40. The granular material accumulated in the portable container below the discharge hopper 40 is removed and deposited in a hopper 136 leading to compartment 38 so that it can be recirculated through the coating apparatus in the described manner.

Referring now to FIG. 7 the path described by the conveyor 22 is such that a row of confections is moved transversely downwardly relative to the direction R in order to momentarily immerse a row of confections in the tank 124 as shown. The conveyor then lifts the row of confections transversely upwardly from the tank 124 and subsequently moves the row longitudinally to the opening 26. Any excess oil which may drip from the confection prior to arriving at the opening 26 falls on the pan 128 and is returned to the trough 122. Again the conveyor 22 moves the row of confections transversely downwardly through the opening 26 and into the coating zone of the casing 24 where the granular material propelled by the blades 30 is applied to the outersurface of the confections. After a predetermined elapsed time, the row of confections is moved transversely upwardly and then in the direction R to a subsequent station wherein the conveyor 22 releases the entire row of confection so that they may be deposited into suitable containers such as bags.

If desired, the rate at which the granular material flows from the hopper 136 to the compartment 38, within which a portion of the screw conveyor 62 is located, may be controlled in order to regulate, in turn, the amount of granular material being recirculated. A shutter mechanism or gate 138 (FIG. 3) comprising a planar plate is mounted for slidable movement, in a plane containing the throat of the hopper 136, so that the rate of flow of granular material from the hopper 136 to the compartment 38 may be varied. Such a variation is, in turn, realized in the casing 24 wherein the amount of granular material therein is dependent upon the rate at which the screw conveyor 62 delivers granular material to the casing 24. Alternatively, or in conjunction with the gate 138, variations in the feed rate of granular material may be achieved by selectively changing the speed at which the screw conveyor shaft 78 rotates. In achieving the variations of shaft speed, the sprocket 96 is replaced with a larger or smaller sprocket to decrease or increase, respectively, the speed at which the shaft 78 rotates. It must be observed, however, that appropriate adjustments of the idler sprocket 100 must be effected when changing the size of the sprocket on shaft 78 in order to maintain a predetermined tension on the chain 104.

Thus it is seen that this invention provides a compact apparatus having a high degree of efficiency. Coating of selected confection is accomplished in a compartment which requires a relatively small amount of granular material while achieving a more uniform distribution of granular material to the outer surface of the confections. This invention provides a structure which can be operated at various time increments by varrying the rate at which granular material is supplied to the coating zone.

It will be understood that modifications and variations may be effected without departing from the scope of the present invention as defined by the claims appended hereto.

Having thus described my invention, what we claim as new and desire to protect by Letters Patents is:

1. A coating apparatus comprising means defining a housing having transverse cross-section of generally inverted heart-shaped configuration defining a coating chamber, means for positioning articles to be coated in the upper portion of said chamber, a pair of counter-rotating impellers in the lower portion of said housing, each impeller having a central shaft and blade means that project radially from said central shaft, each blade being disposed in a skewed orientation relative to the axis of the associated shaft, said impellers being rotatable in a direction such that coating material is hurled upwardly along an adjacent inwardly inclined wall of the housing into the upper portion of the chamber and is moved longitudinally along the chamber from an entrance zone to a discharge zone incident to rotation of said impellers.

2. A coating apparatus according to claim 1 and including a trough parallel to and substantially coextensive with said chamber, passage means establishing communication between said trough and said chamber, means for directing coating material into said trough, and a conveying member movable through said trough for moving coating material through said passage and into the entrance zone of said chamber.

3. A coating apparatus according to claim 2 including a discharge hopper communicating with the discharge zone of said chamber to receive coating material advanced to said discharge zone by the blades of said impellers.

References Cited by the Examiner

UNITED STATES PATENTS

| 2,454,930 | 11/1948 | Kreamer et al. | 118—429 X |
|---|---|---|---|
| 2,489,456 | 11/1949 | Liebel | 118—429 X |
| 2,559,463 | 7/1951 | Rasmusson | 118—30 X |
| 2,689,544 | 9/1954 | Habgood | 118—30 X |
| 2,695,590 | 11/1954 | Zuercher | 118—30 X |
| 2,710,588 | 6/1955 | Parry et al. | 118—24 |
| 2,769,423 | 11/1956 | Landgraber | 118—25 X |
| 3,036,533 | 5/1962 | Burt et al. | 118—24 X |
| 3,085,520 | 4/1963 | Fiedler | 118—30 X |
| 3,129,114 | 4/1964 | Kindman | 118—24 |

FOREIGN PATENTS

| 565,594 | 7/1957 | Italy. |
|---|---|---|

MORRIS KAPLAN, *Primary Examiner.*

RICHARD D. NEVIUS, *Examiner.*